Figure 1:
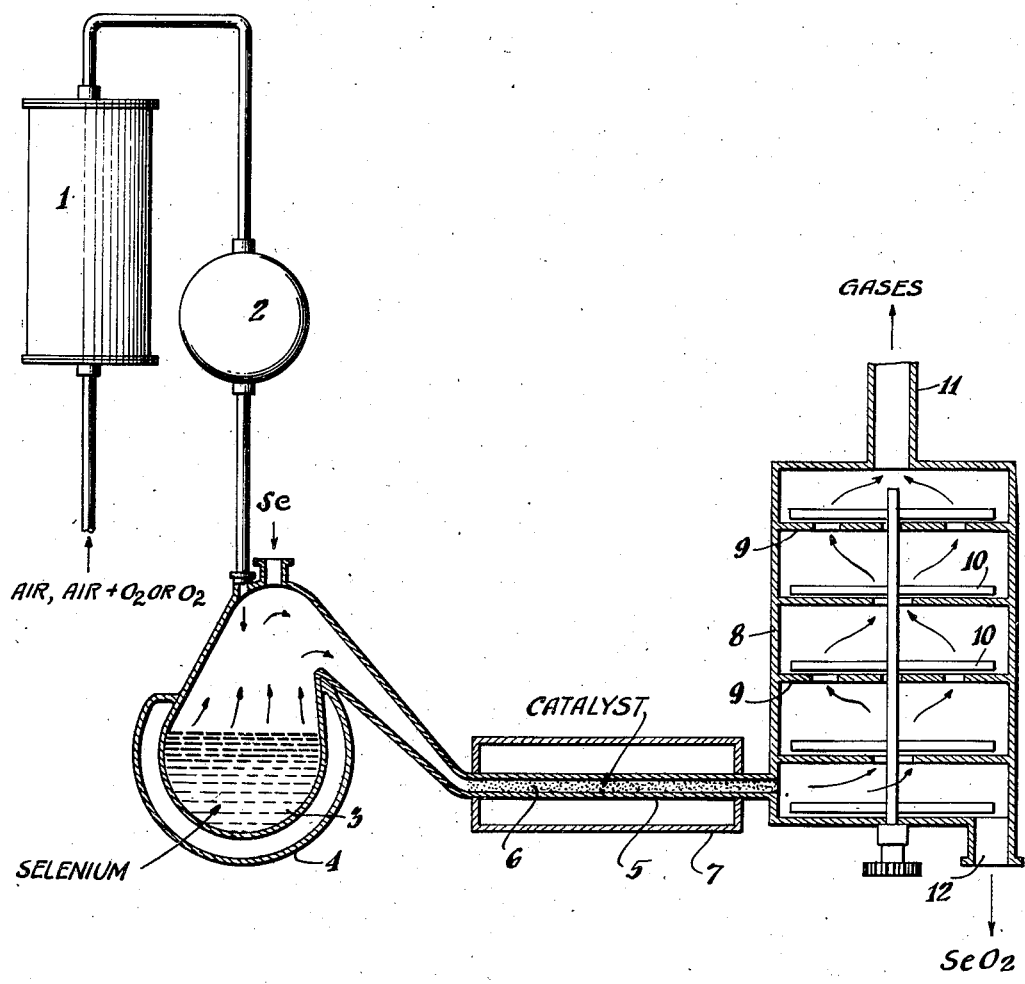

Aug. 27, 1946.  C. W. CLARK ET AL  2,406,666
PROCESS FOR MAKING SELENIUM DIOXIDE
Filed June 16, 1945   2 Sheets-Sheet 1

INVENTORS
Charles W. Clark
Eugene M. Elkin
BY
Ernest D. Given
ATTORNEY

Aug. 27, 1946.   C. W. CLARK ET AL   2,406,666
PROCESS FOR MAKING SELENIUM DIOXIDE
Filed June 16, 1945   2 Sheets-Sheet 2

INVENTORS
Charles W. Clark
Eugene M. Elkin
BY
ATTORNEY

Patented Aug. 27, 1946

2,406,666

UNITED STATES PATENT OFFICE 2,406,666

PROCESS FOR MAKING SELENIUM DIOXIDE

Charles W. Clark and Eugene M. Elkin, Montreal, Quebec, Canada, assignors to Canadian Copper Refiners, Limited, Toronto, Ontario, Canada, a corporation of the Dominion of Canada Application June 16, 1945, Serial No. 599,840

15 Claims. (Cl. 23—139)

The present application relates to the preparation of pure selenium dioxide, which is free of elemental selenium for such uses as the selenium dioxide thus prepared may be appropriate. One such purpose is as an intermediate product in the preparation of pure elemental selenium by a subsequent reduction of the dioxide. As such, the present application is a continuation-in-part of our application Serial No. 494,084, filed July 9, 1943, entitled "Process of making selenium dioxide" which application is in turn a continuation-in-part of our earlier application Serial No. 412,842, filed September 29, 1941, having the same title.

The present invention has for its general object the provision of an improved process for making selenium dioxide of high purity and at a low cost.

Prior practices of making this material have employed both wet and dry methods. The wet methods involved the use of various chemicals and are costly as compared with the dry methods.

Selenium dioxide may also be produced by burning selenium in a stream of pure oxygen containing oxides of nitrogen. The latter are introduced by bubbling the oxygen through fuming nitric acid. Selenium dioxide so produced contains small amounts of oxides of nitrogen and must be subjected to resublimation to remove these.

Various ceramic oxide materials, including silica and various mixtures thereof, have heretofore been tried as catalysts in place of the nitrogen oxides aforesaid for promoting this desired reaction, but without substantial success. Among such materials tried by the prior art are sand, Activated Alumina, glass wool, purified silica, porous porcelain, fire clay, asbestos fibres and various mixtures thereof. Iron oxides and elemental iron or iron alloys have also been tried, but without substantial success. Numerous other materials which have been tried as catalysts for this reaction, but without sufficient success from a commercial point of view to warrant their continued use, have been various metallic oxides including oxides of vanadium, molybdenum, uranium and iron.

We have found, however, that while many of these materials have been used for catalyzing other oxidation reactions, in general they are of little or no value in the direct oxidation of selenium in the gaseous phase, but that complete success may be attained by the use of any one of the following metallic oxide materials as catalysts: copper oxide, chromium oxide and manganese oxide. In the latter two cases at least, the metallic oxide aforesaid may be mixed with an alkali oxide, such as sodium or potassium oxide. A primary object of the present invention, therefore, is to provide an inexpensive, yet highly satisfactory and efficient commercial process of making pure selenium dioxide, using any one of these three materials as a catalyst; the oxidation of the selenium taking place in the gaseous phase and employing a gas having at least a substantial proportion of oxygen such as air, air enriched with oxygen or pure oxygen.

Figure 2:
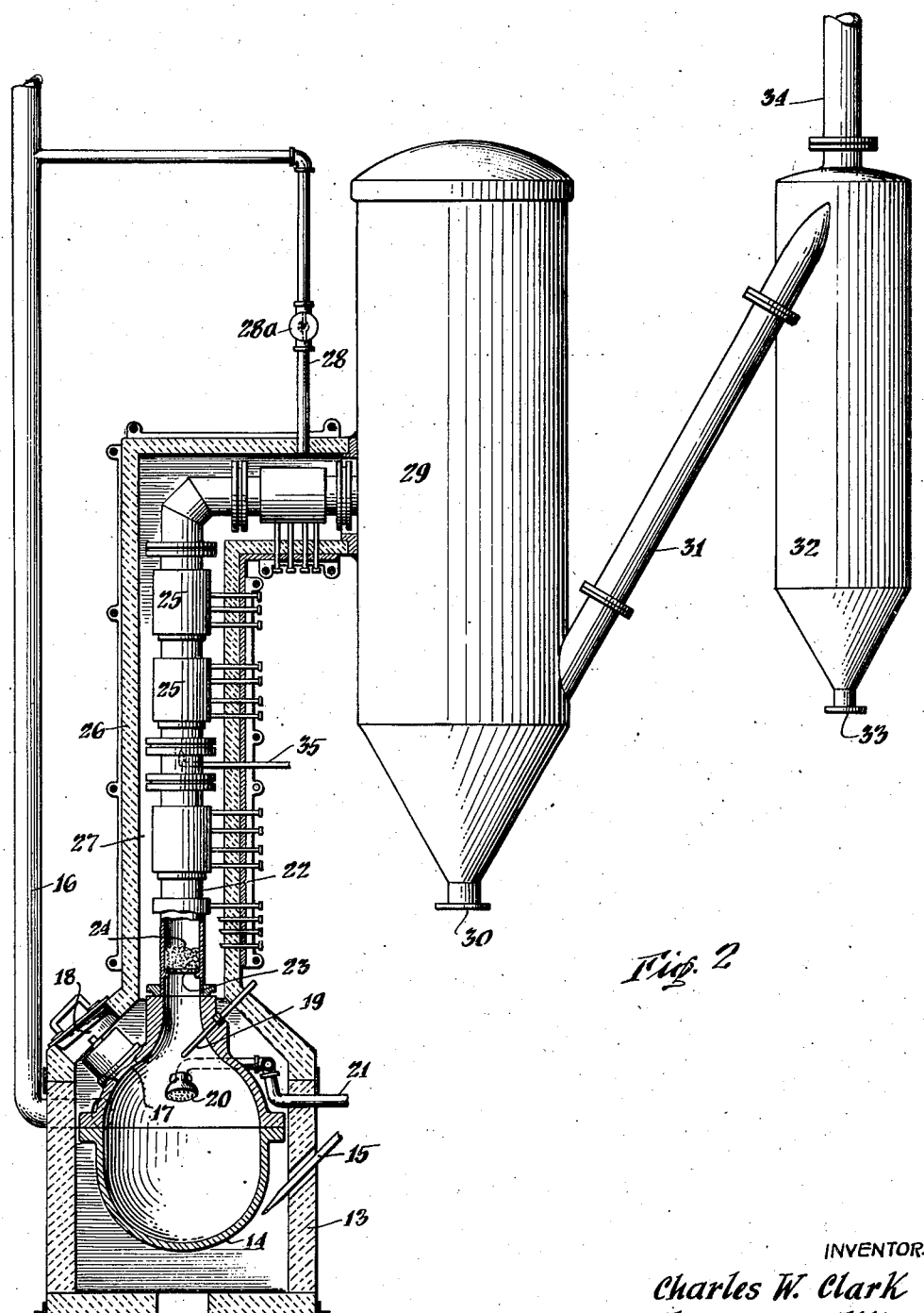

Further and more detailed objects of the present invention will become apparent from the following description and in the appended claims, when taken in connection with the accompanying drawings, in which:

Figure 1 is a more or less diagrammatic view illustrating partly in elevation and partly in vertical section apparatus by which the process may be carried out; and Fig. 2 is a similar view illustrating a commercial form of apparatus embodying the invention.

In the simplest form of apparatus for carrying out the process, air, air enriched with oxygen or pure oxygen is passed over molten selenium and the resultant gaseous mixture is then passed over a suitable solid catalyst in a heated chamber, so as to provide a gaseous phase reaction or oxidation of the selenium vapor. The gases from this catalytic chamber are then passed through a suitable cooling and settling device wherein the gaseous selenium dioxide condenses into a finely divided crystalline form and settles out and may be recovered for use.

Referring to the drawings, particularly Fig. 1, 1 indicates a suitable drier through which air, air enriched with oxygen or oxygen is passed as indicated by the legend on the drawings. From this drier the gaseous mixture, containing at least a substantial proportion of oxygen, passes through a suitable meter 2 into a suitable retort 3, containing molten selenium conveniently heated by suitable means indicated generally by a jacket 4. Any desired heating medium may be circulated through the space between the jacket 4 and the retort 3, or heat may be generated initially in this space as by combustion taking place therein. The mixture of gases from the retort 3, passes through a heated catalytic chamber 5, which contains a solid catalyst 6 and which is preferably surrounded by a heating chamber or other heating means generally indicated by a jacket 7. A suitable temperature at which the catalyst should be maintained is between 603° F. and 1250° F., although higher temperatures may be employed if desirable. We prefer a temperature range between 700° F. and 800° F. The resulting gases from the catalytic chamber are then passed through a suitable cooling and settling device, generally indicated at 8, of any convenient form, that shown having a plurality of staggered shelves 9 with cooperating scraping blades 10. From the top of this device 8, a conduit 11 leads to a stack or directly to the atmosphere for the exhaust of gases therefrom. Solid, finely divided, crystalline selenium dioxide, in an extremely pure form, passes from an outlet 12 at the bottom and may be collected in any suitable manner.

Instead of passing the oxygen-containing gases directly into contact with and over the molten selenium, such gases may be mixed with hot selenium vapors and the mixture then passed over the solid catalyst 6 in the chamber 5.

Furthermore, if desired, an additional supply of oxygen-containing gases, such as air, air enriched with oxygen or pure oxygen, may be introduced into the stream of gases passing as aforesaid, prior to the exit of such gases from the catalytic chamber 5, that is, either into the stream before it enters the catalytic chamber or at any point along such chamber. This feature of the invention will be further discussed in describing the form of the invention shown in Fig. 2.

It is also possible, instead of using selenium vapors as such, to blow finely divided selenium by compressed air, air enriched with oxygen or pure oxygen into a heated chamber, so as to make the desired gaseous mixture for reaction within the catalytic chamber 5. In this form also a secondary supply of oxygen or an oxygen-containing gaseous mixture may be employed.

If it is desired to recover selenium dioxide in a dissolved state, the gases containing selenium dioxide may be passed from the catalytic chamber 5 or from the cooling and settling device 8 through a suitable solvent such as water.

We have found that certain materials operate as catalysts to enable this process to be carried on to completion. Thus starting with selenium of a commercial grade and having substantial amounts of impurities, the present process provides for the making of an extremely pure form of selenium dioxide, which is wholly free of any elemental selenium as may be detected by analytical methods and which is further so pure that the total impurities are usually less than about five parts per million. For example, it has been found by analysis that the detectable impurities may be as follows: copper, 0.1 part per million; iron, 0.1 part per million; tellurium, 0.5 part per million; non-volatile residue, less than 5 parts per million and elemental selenium, not detected. As a starting material, selenium having the following analysis (of impurities) has been used: Te .039%, Fe .0037%, $SiO_2$ .008%, Pb .003%, Cu .002%, and S .0034%. The $SeO_2$ produced by the process of the present invention from this starting material was found to contain less than one part per million of the above impurities.

In Fig. 2 there is shown a commercial form of apparatus for carrying on the process hereinabove generally described. As shown, this apparatus includes a housing 13 of any desired construction and arranged to provide a controlled internal temperature by the use of this lower portion as a furnace. Within this housing is a retort 14, which may be supported in any suitable manner (not shown). The lower portion of the housing 13 is provided with suitable combustion means such as a fluid fuel burner diagrammatically illustrated at 15 and a passage 16 for exhaust gases, which may lead to a stack in the usual manner. Means are provided for introducing selenium into the retort 14, such means comprising a covered opening 17 in the retort and an aligned covered opening 18 in the adjacent portion of the housing 13. A thermometer well indicated at 19 may also be provided for receiving temperature indicating means such as a thermometer or thermocouple for indicating and/or recording the temperature of the gases in the upper portion of the retort. Air, air enriched with oxygen or pure oxygen may be introduced into the upper portion of the retort through one or more nozzles 20 to which such gases are supplied from a pipe 21 from any suitable source. This pipe, at some point not shown, may, if desired, be provided with a suitable drier as shown at 1 in Fig. 1, in order that the gases introduced may be dried. These oxygen containing gases may also be preheated to a predetermined temperature if desired or necessary.

Above and in vertical alignment with the retort as shown is a catalytic chamber generally indicated at 22 which is provided at various levels with transverse screens 23 upon which the catalytic material 24 hereinafter described is disposed. Parts of this chamber or all of it may be provided with temperature control means in order to maintain desired temperatures for the reaction within the catalytic chamber as aforesaid. For this purpose there is shown a plurality of jackets 25, each of which diagrammatically illustrates a temperature controlling means such as an electric resistance heater. Also completely surrounding the entire catalytic chamber 24 is an upstanding hollow column portion 26 of the housing 13 to provide an intervening space 27 through which a selected part of the products of combustion may pass so that at least a portion of the required amount of heat may be secured from this source. The use of the electric heating means affords an accurate control of temperature within the catalytic chamber to an extent not always obtainable by the combustion heating means, although the latter may be used for part of the heat as a more inexpensive source thereof. Products of the combustion from the space 27 may pass through a pipe 28, joining the pipe 16 leading to a suitable stack (not shown). The pipe 28 is shown provided with a suitable damper means 28a, by which the products of combustion flowing through the space 27 may be controlled.

The gaseous products from the catalytic chamber pass thence to a condenser shown diagrammatically at 29, the internal construction of which per se forms no part of the present invention. Within this condenser, however, substantially all the selenium dioxide formed by the process is condensed out of the gases and may then pass through a suitable hopper portion of this chamber at the lower end thereof to an outlet 30, from which it may be disposed of in any desired manner. Gaseous products not condensed within the condenser 29 pass thence through a pipe 31 to a separator 32 (also shown diagrammatically) and which may be of an electrical type such as the well-known Cottrell separator. Solid materials separated from the gases pass thence through a bottom opening indicated generally at 33 and gaseous products are exhausted through a pipe 34.

In some instances, it may be desired to use a secondary source of oxygen in completing the oxidation as hereinabove set forth. For this purpose there is shown, associated with the catalytic chamber in the present instance, a pipe 35 through which a secondary supply of gas rich in oxygen, that is, air enriched with oxygen, or pure oxygen, may be introduced into the catalytic chamber a sufficient distance in front of the downstream end thereof considered from the point of view of the flow of gases therethrough, to afford an adequate supply of oxygen for completing the oxidation of all selenium vapor. The use of such a secondary supply or even several such supplies at desired points in the process is to be considered within the purview of the present invention.

As hereinabove set forth, many materials have been investigated to ascertain their ability to catalyze the reaction above described of completely oxidizing selenium to selenium dioxide in the gaseous phase and to secure pure selenium as a resulting product. Most of these materials have been found wanting by reason of their failure to cause the reaction to go to 100% completion. Very minute amounts of elemental selenium can be easily detected in the finished product by the color thereof, as such minute amounts will give a perceptible red or pink color. This is more noticeable when the product is dissolved, so that a material, which appears white when solid, may be somewhat pink in solution. The product in accordance with this invention is colorless even in solution. We have found that catalysts which will accomplish this complete oxidation of selenium are included in the group which consists of the oxides of copper, chromium and manganese. The catalyst is preferably distributed so as to afford a maximum surface in accordance with known principles involving the use of catalysts for gaseous reactions. In this case the catalyst is disposed over a carrier which is preferably of a porous nature and may, for example, be a porous ceramic material in lumpy form, such as Activated Alumina. As above set forth the Activated Alumina is not itself a catalyst for the reaction. In preparing the catalyst for use, this carrier is first saturated with a water solution of a salt of or including the metal, the oxide of which is the desired catalyst, the saturated carrier is then dried, and subsequently calcined to reduce the metal to its oxide form. When it is desired to use copper oxide as a catalyst, the carrier material may be saturated with a soluble copper salt, such as copper nitrate, which, upon calcining, will result in copper oxide and other wholly gaseous products. Other copper salts, which are water soluble, have been tried with successful results, including copper sulfate ($CuSO_4$) and copper acetate $Cu(OOCCH_3)_2$.

When chromium is to be used, which is the preferred form of the present invention by reason of the cost of the raw materials, but not by reason of any other superior characteristics in use, the carrier material may be saturated with a solution of potassium bichromate ($K_2Cr_2O_7$). Then, upon subsequent drying and calcining, there will be deposited upon the carrier a mixture of the oxides of potassium and chromium. In this case we have found that it is the oxide of chromium which is the active catalyst, although this action is not substantially or perceptible inhibited or retarded by the presence therewith of some potassium oxide. Sodium bichromate has been similarly tried with substantially as good results. Similarly, in using as a catalyst an oxide of manganese, the catalyst may be prepared by saturating the carrier with a soluble manganese salt such as potassium permanganate ($KMnO_4$). This salt, upon drying and calcining, results in a mixture of the oxides of potassium and manganese in which the manganese is the active catalyst but is not interfered with to any substantial extent by the presence therewith of the potassium oxide.

While we have shown and described but one diagrammatic and one commercial form of apparatus embodying our invention, and described the process as carried out with a restricted group only of catalytic materials, we do not wish to be limited except by the scope of the appended claims, which are to be construed validly as broadly as the state of the prior art permits.

What is claimed is:

1. The process of making pure selenium dioxide, free of elemental selenium, which comprises effecting a gaseous phase oxidation of vaporized selenium with a gas containing at least a substantial proportion of oxygen in the presence of a solid catalyst selected from the group consisting of the oxides of copper, chromium and manganese.

2. The process of making pure selenium dioxide, free of elemental selenium, which comprises effecting a gaseous phase oxidation of vaporized selenium with a gas containing a substantial proportion of oxygen by passing such an oxygen-containing gas over molten selenium, then passing the resulting mixed gases into a chamber containing a catalyst selected from the group consisting of the oxides of copper, chromium and manganese.

3. The process of making pure selenium dioxide, free of elemental selenium, which comprises effecting a gaseous phase oxidation of vaporized selenium with atmospheric air in the presence of a solid catalyst selected from the group consisting of the oxides of copper, chromium and manganese.

4. The process of claim 1 wherein the oxygen-containing gas is atmospheric air enriched with oxygen.

5. The process of claim 1, wherein the oxygen-containing gas is substantially pure oxygen.

6. The process of claim 1, wherein the metallic oxide catalyst has present therewith an alkali oxide.

7. The process of claim 1, wherein the metallic oxide catalyst has present therewith potassium oxide.

8. The process of making pure selenium dioxide, free of elemental selenium, which comprises effecting a gaseous phase oxidation of vaporized selenium with a gas containing at least a substantial proportion of oxygen in the presence of a catalyst consisting of solid copper oxide.

9. The process of making pure selenium dioxide, free of elemental selenium, which comprises effecting a gaseous phase oxidation of vaporized selenium with a gas containing at least a substantial proportion of oxygen, in the presence of a catalyst, which is prepared by saturating a porous lumpy catalytically-inert ceramic material with a water solution of copper nitrate, drying and calcining to convert the copper nitrate into oxide.

10. The process of making pure selenium dioxide, free of elemental selenium, which comprises effecting a gaseous phase oxidation of vaporized selenium with a gas containing at least a substantial proportion of oxygen in the presence of a catalyst consisting of the solid oxide of chromium.

11. The process of making pure selenium dioxide, free of elemental selenium, which comprises effecting a gaseous phase oxidation of vaporized selenium with a gas containing at least a substantial proportion of oxygen, in the presence of a catalyst, which is prepared by saturating a porous lumpy catalytically-inert ceramic material with a water solution of potassium bichromate, drying and calcining to convert the potassium bichromate into potassium and chromium oxides.

12. The process of making pure selenium dioxide, free of elemental selenium, which comprises effecting a gaseous phase oxidation of vaporized selenium with a gas containing at least a substantial proportion of oxygen in the presence of a catalyst consisting of the solid oxide of manganese.

13. The process of making pure selenium dioxide, free of elemental selenium, which comprises effecting a gaseous phase oxidation of vaporized selenium with a gas containing at least a substantial proportion of oxygen, in the presence of a catalyst, which is prepared by saturating a porous lumpy catalytically-inert ceramic material with a water solution of potassium permanganate, drying and calcining to convert the potassium permanganate into potassium and manganese oxides.

14. The process of claim 1, wherein the catalyst is maintained in a temperature range of about 700° F. to about 800° F.

15. The process of making pure selenium dioxide, free of elemental selenium, which comprises passing a current of a gas containing at least a substantial proportion of oxygen over molten selenium, passing the resulting gaseous mixture into a chamber containing a solid oxide catalyst selected from the group consisting of the oxides of copper, chromium and manganese and at a point prior to the flow of the gaseous mixture out of contact with the catalyst, adding a further selected proportion of a gas containing at least a substantial proportion of oxygen to ensure the complete oxidation of the selenium.

CHARLES W. CLARK.
EUGENE M. ELKIN.